US005470968A

United States Patent [19]

Katcher et al.

[11] Patent Number: 5,470,968
[45] Date of Patent: * Nov. 28, 1995

[54] PROCESS FOR PREPARING NON-HYDROXYPROPYLATED, CROSSLINKED, PREGELATINIZED, STARCH AND PRODUCT

[75] Inventors: Jay H. Katcher, Chestnut Ridge, N.Y.; Charles W. Bertalan, New Brunswick, N.J.

[73] Assignee: Kraft Foods, Inc., Northfield, Ill.

[*] Notice: The portion of the term of this patent subsequent to Feb. 16, 2010, has been disclaimed.

[21] Appl. No.: 298,525

[22] Filed: Aug. 30, 1994

Related U.S. Application Data

[63] Continuation of Ser. No. 92,158, Jul. 15, 1993, Pat. No. 5,342,932, which is a continuation-in-part of Ser. No. 17,711, Feb. 16, 1993, abandoned, which is a continuation-in-part of Ser. No. 823,510, Jan. 21, 1992, Pat. No. 5,187,272.

[51] Int. Cl.$^6$ .......................... C08B 31/08; C08B 33/04; A23L 1/05; A23L 1/187
[52] U.S. Cl. .......................... 536/102; 536/111; 127/65; 127/69; 127/70; 127/71; 426/578; 426/579
[58] Field of Search ...................... 536/102, 106, 536/111; 127/65, 69, 71, 70; 426/578, 579

[56] References Cited

U.S. PATENT DOCUMENTS

| | | | |
|---|---|---|---|
| 3,097,969 | 7/1963 | Roscelli | 536/102 |
| 3,489,719 | 1/1970 | Savage et al. | 536/106 |
| 3,876,629 | 4/1975 | Lotzgesell | 536/106 |
| 4,207,355 | 6/1980 | Chiu et al. | 536/106 |
| 4,228,199 | 10/1980 | Chiu et al. | 536/106 |
| 4,229,489 | 10/1980 | Chiu et al. | 536/106 |
| 4,280,851 | 7/1981 | Pitchon et al. | 127/33 |
| 4,431,800 | 2/1984 | Leusner et al. | 536/111 |
| 4,477,480 | 10/1984 | Seidel et al. | 426/578 |
| 4,847,371 | 7/1989 | Schara et al. | 536/111 |
| 4,969,955 | 11/1990 | Rudin | 127/71 |
| 5,187,272 | 2/1993 | Katcher et al. | 536/102 |
| 5,342,932 | 8/1994 | Katcher et al. | 536/102 |

FOREIGN PATENT DOCUMENTS 949965   6/1974   Canada .

Primary Examiner—Nathan M. Nutter
Attorney, Agent, or Firm—Thomas R. Savoie; Thomas A. Marcoux

[57] ABSTRACT

Raw starch which has been treated with an emulsifying agent during a wash step, such as during refining, is alkali-treated, washed to remove flavor, crosslinked, neutralized, gelatinized and dried to give instant starch useful for instant puddings and mixes.

11 Claims, No Drawings

PROCESS FOR PREPARING NON-HYDROXYPROPYLATED, CROSSLINKED, PREGELATINIZED, STARCH AND PRODUCT

This is a continuation of application Ser. No. 08/092,158 filed on Jul. 15, 1993, and now U.S. Pat. No. 5,342,932, which application is a continuation-in-part of Ser. No. 017,711 filed Feb. 16, 1993, now abandoned which in turn is a continuation-in-part of Ser. No. 823,510, filed Jan. 21, 1992, and now U.S. Pat. No. 5,187,272, which is hereby incorporated by reference.

This invention relates to processing starch materials and products and is particularly useful for upgrading the quality of pregelatinized waxy maize starch for use in desserts.

DESCRIPTION OF THE PRIOR ART

An alkali treatment, wash, neutralization, and spray drying of starch using a two fluid nozzle is taught by Seidel, et al., U.S. Pat. No. 4,477,480. Two fluid nozzles for cooking starch are taught by Pitchon, et al., U.S. Pat. No. 4,280,851.

The prior art, however, has not discovered how to make deflavored cereal starch of good viscosity and flavor without a hydroxypropylation step which produces undesired propylene chlorohydrin. Crosslinked tapioca starch is presently used when good, high viscosity, pregelatinized starch is required for puddings. Hydroxypropylated, deflavored, crosslinked, pregelatinized dent cornstarch has also been used.

SUMMARY OF THE INVENTION

We have discovered a process that can be used to upgrade cereal starches such as waxy maize starch and other applicable cereal starches, including corn hybrids and corn genetic varieties, such as amylo maize starch and dull waxy starch, that need deflavoring so that they may be used in instant puddings without the need for hydroxypropylation. We have discovered that for waxy maize starch deflavoring must be done before crosslinking. We have also discovered that any oil which is present on the surface of the starch granules interferes with the dispersability of the pregelatinized, crosslinked, non-hydroxypropylated starches of this invention. In our prior patent it was disclosed that the addition of an emulsifier was effective to overcome the presence of the aforementioned surface oil. It was further disclosed that the emulsifier could be added to the deflavored, cross-linked, non-hydroxypropylated starch either before or after the starch is dried.

It has now been found that a comparable result can be achieved by modifying the starch refining process so that a raw cereal starch material is produced which contains little or no surface oil. This result can be effected by adding an emulsifier during one of the washing steps normally present in starch refining processes. The presence of an emulsifier during the washing step would substantially remove the oily film surrounding the starch granules and/or leave a residual film of emulsifier on the surface of the starch granules. Raw starch granules produced in this manner may thereafter be deflavored and cross-linked and dried in accordance with the teachings of our prior invention. Accordingly, the emulsifier-treated, refined, raw starch is pH adjusted in water to at least 11.0 with alkali, and the starch material is then washed with water to remove flavor or flavor precursors that would become apparent during storage of a starch, such as waxy maize starch, which was not washed before the chemical treatment.

Alternatively, it would also be possible to treat refined starch with the emulsifier during the deflavoring step. Thus, the water used to remove flavor and flavor precursors from the starch may contain an emulsifier. The refined and slurried starch would therefore be treated with an emulsifier in accordance with our prior invention.

The emulsifier and alkaline-treated and deflavored starch is next crosslinked, neutralized and thereafter pregelatinized and dried. Pregelatinization may be effected by cooking in a two-fluid, spray-drying nozzle, as described in the aforementioned Pitchon, et al. patent. Alternatively, pregelatinization and drying may be effected by drum drying the delivered, crosslinked starch material or by cooking the delivered, pregelatinized starch material or by cooking the delivered, pregelatinized starch material in a water-miscible solvent at high temperature and pressure and then drying, such as by means of alcohol precipitation followed by oven drying.

The process of this invention will be described below in connection with the use of the two-fluid, spray-drying nozzle which represents the preferred method for pregelatinization and drying; however, as noted above this invention is not limited to the use of this specific technique.

We have found that the resulting product is free from objectionable flavor development during storage, and is of suitable viscosity and wetting ability so as to be usable in instant pudding mixes in place of crosslinked pregelatinized tapioca starch or hydroxypropylated dent corn starch.

DETAILED DESCRIPTION OF THE INVENTION

Waxy maize grain delivered to the mill is processed in a conventional manner. Thus, the grain may be cleaned, soaked in warm water and after sufficient hydration has been effected the grain is coarsely wet milled in order to remove germs from the hulls. The germ is then separated from what remains of the grain, such as by passage over screens. The coarse grist which contains hulls, fiber and particles of endosperm is then subjected to fine grinding to loosen the starch granules from the gluten. The remaining slurry of starch and gluten is then subjected to any of various separation processes which typically result in flotation of the gluten and sedimentation of the starch or centrifugal separation of the starch. The separated starch granules are thereafter washed with water, such as by spraying, in order to remove gluten from the surface of starch granules. After washing, the starch is dried or held in slurry form for further processing. In accordance with this invention the washing of the separated starch is done with emulsifier-containing water. Typically the wash water will contain from 0.01 to 2% by weight of emulsifier, preferably from 0.05 to 1%. The washed starch may retain a small amount of emulsifier on its surface.

Any food-approved emulsifier will work provided the HLB value is greater than 1.0 and the emulsifier is present at levels high enough to overcome the tendency of the starch to clump. Polysorbate 60 at about 0.5% of the starch by weight is suitable. Typical useful emulsifiers include the sorbitan esters, ethoxylated mono and diglycerides, propylene glycol esters and lactylated esters. These emulsifiers are used as examples but in no way limit the use of other food grade emulsifiers as long as they function to enhance the dispersion of the pregelatinized starch produced in this manner. The emulsifiers are preferably employed at levels from 0.1 to 1.0% of the starch.

The dried or slurried, emulsifier-treated raw starch is then further processed in accordance with the invention of U.S. Pat. No. 5,187,292.

A homogeneous waxy maize starch slurry is formed by adding sufficient water to the dried, emulsifier-treated starch or, if need be, adjusting the solids concentration of the refined and washed starch slurry so that the resulting slurry concentration is preferably at least 25%, typically 35–45% starch. For economic reasons, starch concentrations are kept as high as possible during processing.

Alkaline material is added to bring the slurry pH to 11.3 to 12.0, preferably pH 11.4–11.8. Any suitable base selected from the group consisting of salts and hydroxides of the alkali metals, alkaline-earth metals, ammonium and organic alkalis or mixtures thereof can be employed although we prefer alkali hydroxides. Alkali hydroxides are added in a 1 to 10% concentration, preferably 3% to the slurry. If the alkali hydroxide concentration is too high, the starch slurry would exhibit localized gelling. This would render the starch slurry unusable unless these gel lumps are screened from the slurry. If the alkali hydroxide is too low in concentration, too much liquid is added to the starch slurry negatively effecting processing economics.

Once the starch dispersion pH is adjusted, we allow the dispersion to mix for at least five minutes to allow flavor materials and flavor precursors to be freed from the starch. Normally, the higher the pH, the shorter the treatment time for flavor removal. Higher pH is possible up to the pasting pH which is normally around pH 12.4 or 12.5.

The starch is washed with water to remove residual flavor and flavor precursors while maintaining the starch at pH 11.0 or greater. Any conventional washing techniques can be employed so long as the pH is maintained at or above 11.0, preferably 11.3 or greater and more preferably pH 11.4 to 11.8. The starch slurry concentration after washing should be 25% solids or greater for economy reasons, preferably 35–45% solids. We have found a Merco brand washing centrifuge by Dorr-Oliver Co. gives good results.

The starch is next crosslinked using conventional conditions and crosslinking agents, such as phosphorous oxychloride, sodium trimetaphosphate, epichlorohydrin and the like. We prefer to employ up to 0.1% phosphorous oxychloride depending on the viscosity of the product desired.

The crosslinked starch is next neutralized using a food-grade acid such as organic and inorganic acids. We prefer citric acid, hydrochloric acid, phosphoric acid, sulfuric acid and mixtures thereof particularly phosphoric acid. We neutralize the starch to pH 5.0–9.0, preferably a pH between 6–8 or 7.5–9.0. Often, pH 5–6.5 or pH 7.5–9.0 is desirable. For viscosity stability and powder color quality, pH of 5.0–6.5 is employed. For cereal starches with difficult to remove flavors, a pH of 7.5–9.0 is required to insure that flavor remains acceptable during storage. Final pH range depends upon the situation encountered. In this situation a pH of 5.0–6.5 is preferred. In all cases, the starch slurry can be neutralized by adding the acid, preferably at a concentration which will not overly dilute the slurry.

The starch is next gelatinized, such as by the use of the two-fluid nozzle disclosed in Pitchon, et al., U.S. Pat. No. 4,280,851 at FIGS. 5 and 6. According to this technique, the starch slurry is at least 25% solids for economic reasons, preferably 35%–45% solids is treated with the steam impinging on the starch granules within the spray nozzle to cook the starch.

The cooked starch leaving the two fluid nozzle chamber may be dried in a spray drier using conventional conditions, as described in the aforementioned Pitchon, et al. patent.

The dry product may be ground and sieved to give any size product. The final product is a storage-stable, good tasting, high-viscosity, non-hydroxypropylated, crosslinked, pregelatinized starch useful for instant pudding powdered mixes or other products which are to be incorporated into cold aqueous mediums, such as milk. We do not need to use alkali or alkaline earth salts such as sulfates or chlorides during the crosslinking process and do not need to employ a hydroxypropoxylation step. Conventional crosslinking is sufficient when combined with prior alkali washing and with emulsifier treatment to produce a quality product.

This invention is further described but not limited by the following examples.

EXAMPLE 1

25,000 gallons of waxy maize starch slurry, containing 100,000 pounds of dry solids, was introduced into a mixing vessel under high agitation. A 3% sodium hydroxide solution was slowly added to the vortex of the starch slurry. The 3% sodium hydroxide solution was added slowly until a pH of 11.5 was reached. Sixty-six pounds of phosphorous oxychloride was added to the slurry's vortex and allowed to mix for 1 hour to crosslink the starch. The starch slurry was deflavored, as taught in U.S. Pat. No. 4,477,480 by washing with water with a Dorr-Oliver Model C-30W centrifuge. Slurry concentration dropped to 32% solids after deflavoring. The slurry was neutralized to a pH of 6.0 by the addition of phosphoric acid. This material was pregelatinized, as taught in U.S. Pat. No. 4,280,851 by spray-cooking and drying. The material was ground and screened to proper particle size as taught in U.S. Pat. No. 4,438,148. The starch on storage developed off-flavors which made its use in vanilla or chocolate instant puddings unattractive. Pudding mixes containing this starch were found to clump when prepared with cold milk.

EXAMPLE 2

The process set forth previously is repeated except that the starch is washed after the pH is raised to 11.5 with 3% aqueous sodium hydroxide as taught in U.S. Pat. No. 4,477,480 using a Dorr-Oliver washing centrifuge while maintaining the starch pH above 11.0. The starch is then crosslinked by adding the same amount of phosphorous oxychloride to the slurry and mixing for one hour and, thereafter, is neutralized to pH 6 using phosphoric acid. The material is then pregelatinized by spray drying using a two-fluid nozzle described in U.S. Pat. No. 4,280,851. The dry starch may be ground if necessary and screened to a desired particle size. No off flavors were developed during storage.

Pudding mixes containing this starch were found to clump when prepared with cold milk.

EXAMPLE 3

250 gallons of waxy maize starch slurry, containing 1,000 pounds of dry solids, was introduced into a mixing vessel under high agitation. A 3% sodium hydroxide solution was added to the vortex of the starch slurry. The 3% sodium hydroxide solution was added slowly until a pH of 11.5 was reached. The starch slurry was deflavored, as taught in U.S. Pat. No. 4,477,480 by washing the slurry with water with a Dorr-Oliver centrifuge. The slurry concentration dropped to 34% solids after the deflavoring step. The slurry pH after washing was above pH 11.2. The starch was crosslinked by adding 0.66 pounds of phosphorous oxychloride to the slurry vortex. The slurry was mixed for one hour then the pH was neutralized to 6.0 by the addition of phosphoric acid into the vortex. This material was pregelatinized as taught in U.S. Pat. No. 4,280,851 and ground and screened to a useful particle size as taught in U.S. Pat. No. 4,438,148.

When used in an instant pudding mix, the resultant prepared pudding had good viscosity, mouthfeel and flavor. As before, pudding texture was poor due to poor dispersion. Even if the puddings were prepared with a coarser granulation pregelatinized waxy maize starch where the –400 mesh fraction was removed and the starch granulation was essentially 100% between a U.S. 200 mesh and U.S. 400 mesh fraction, dispersion remained poor when puddings were prepared.

This starch was coated with 0.5% polysorbate 60. When the starch coated with polysorbate 60 was used in an instant pudding mix, the resultant prepared pudding had the desirable texture (smooth, continuous, homogeneous, non-grainy), high sheen appearance, mouthfeel and viscosity as is characteristic of puddings prepared with heavily modified starches (e.g. substituted) as taught in U.S. Pat. No. 4,847,371 or crosslinked tapioca starch which does not have to be deflavored as taught in U.S. Pat. No. 4,477,480 and does not have the dispersability problem problems of crosslinked waxy maize pregelatinized as taught in U.S. Pat. No. 4,280,851. If waxy maize is both hydroxypropylated and crosslinked, there is no dispersability problem as is encountered with only crosslinked waxy maize. However, the hydroxypropylation process is time consuming, equipment intensive, adds chemical cost and has a propylene chlorohydrin residue.

The process of this invention produces a low cost crosslinked waxy maize starch that disperses easily in cold milk and is storage stable as to flavor and precludes the need to use expensive tapioca starch. Pudding bases prepared with starch material from this Example 3 remained good tasting and free of off flavor during storage.

The emulsifier (e.g. polysorbate 60) can be added to the slurry prior to the pregelatinization step (spray cooking and drying) and will function in a similar manner to the coating process previously described. By adding the emulsifier to the slurry prior to spray cooking and drying, a separate processing step can be eliminated.

Further, the emulsifier could be added during refining of the raw starch, such as in the wash water used to remove gluten from the surface of separated starch granules. In this manner, the raw starch material which is deflavored and then cross-linked according to this invention will not have to be treated with emulsifier during or after the modification process.

What is claimed:

1. A process for preparing a non-hydroxypropylated, cross-linked, prgelatinized cereal starch selected from the group consisting of corn hybrids and genetic corn varieties comprising:
   a) obtaining raw starch from cereal grain by means of a refining process:
   b) washing the raw starch of step a) with water which contains from 0.01 to 2.0% by weight of an emulsifier having an HLB value greater than 1.0;
   c) dispersing and agitating the raw, refined cereal starch in water to form a homogeneous slurry containing at least 25% starch;
   d) crosslinking the starch using any food-acceptable procedure;
   e) gelatinizing and drying the starch using a process selected from the group consisting of spray drying using a two-fluid nozzle, drum drying, and cooking in a water-miscible solvent at high temperature and pressure followed by drying.

2. The process of claim 1 wherein the wash water contains from 0.05 to 1.0% by weight of the emulsifier.

3. The process of claim 1 wherein the cereal starch is selected from the group consisting of waxy maize starch, amylo maize starch and dull waxy starch.

4. The process of claim 1 wherein the cereal starch is waxy maize starch.

5. A process for preparing a non-hydroxypropylated, cross-linked, pregelatinized cereal starch selected from the group consisting of corn hybrids and corn genetic varieties comprising:
   a) dispersing and agitating raw starch in water to form a homogeneous slurry containing at least 25% starch;
   b) crosslinking the starch using any food-acceptable procedure;
   c) washing the starch with water which contains from 0.01 to 1.0% by weight of an emulsifier having an HLB value greater than 1.0;
   d) gelatinizing and drying the starch using a process selected from the group consisting of spray drying using a two-fluid nozzle, drum drying, and cooking in a water-miscible solvent at high temperature and pressure followed by drying.

6. The process of claim 5 wherein the wash water contains from 0.05 to 1.0% by weight of the emulsifier.

7. The process of claim 5 wherein the cereal starch is selected from the group consisting of waxy maize starch, amylo maize starch and dull waxy starch.

8. The process of claim 5 wherein the cereal starch is waxy maize starch.

9. A process for preparing a non-hydroxypropylated, cross-linked, pregelatinized cereal starch selected from the group consisting of corn hybrids and corn genetic varieties comprising:
   a) dispersing and agitating raw starch in water to form a homogeneous slurry containing at least 25% starch;
   b) crosslinking the starch using any food-acceptable procedure;
   c) adding to the slurry an emulsifier having an HLB value greater than 1.0 at a level of addition of from 0.1 to 1.0% by weight of the starch;
   d) gelatinizing and drying the starch using a process selected from the group consisting of spray drying using a two-fluid nozzle, drum drying, and cooking in a water-miscible solvent at high temperature and pressure followed by drying.

10. The process of claim 9 wherein the cereal starch is selected from the group consisting of waxy maize starch, amylo maize starch and dull waxy starch.

11. The process of claim 9 wherein the cereal starch is waxy maize starch.

\* \* \* \* \*